United States Patent Office 2,772,265
Patented Nov. 27, 1956

2,772,265

PROCESS FOR THE RECOVERY OF COAL RESINS WITH SIMULTANEOUS PARTIAL DESULPHURISATION OF THE COAL

Salimuzzaman Siddiqui, Karachi, Pakistan

No Drawing. Application June 29, 1954,
Serial No. 440,290

5 Claims. (Cl. 260—107)

This invention relates to the desulphurisation and improvement of coals and to the recovery of coal resins and waxes therefrom.

Some of the lignite and sub-bituminous coals carry varying proportions of resinous and waxy materials, economic recovery of which can be of considerable industrial value. Of the waxy materials, an instance in point is the Montan wax which occurs in some of the German brown coals. Resins with properties similar to those of copal can be extracted from the Yallourna brown coal, and reddish to dark brown resins are further noted to occur in some of the low-grade coals of the Indo-Pakistan sub-continent.

The usual procedure employed for the recovery of resins and waxes from coals is based on solvent extraction, which because of the costs involved and non-availability of the solvents in the industrially under-developed countries is often not a feasible economic proposition. A way out of this difficulty has been sought in the electrostatic separation of the resin from the crushed coal material, taking advantage of the difference in the electrical properties of the coal and the resin. This process, however, is not practicable in all cases, and mostly yields the resin mixed with quite large quantities of coal, necessitating its subsequent extraction with solvents.

In the course of investigations on the low grade sulphur-bearing coals of Western Pakistan, the occurrence of a fairly high percentage of resin (ranging up to 10%) has been noted in some of them, particularly in the non-coking coal from the Makerwal area in the Punjab. This resin can be extracted with the help of mixed organic solvents like benzene and chloroform, but for the reasons already stated its solvent extraction is not practicable.

The process to which the present invention relates consists in subjecting powdered coal, e. g. 20–60 mesh British Standard Sieve, to the action of superheated steam at sub-carbonisation temperatures in the preferred temperature range of about 200° C. to 300° C. Under this treatment the resin distils over with steam, in a depolymerised and chemically modified form, and can be collected by fractional condensation in liquid, semi-solid and solid fractions, which can be subsequently employed in the manufacture of varnishes, enamels and other industrially useful products. Starting at a temperature of about 150° C., the distillation of the resin proceeds more vigorously from 200° C. onwards, and the operation is nearly completed in 4 to 5 hours at 280° C.±5° C. On further treatment with superheated steam from 280° C. to 330° C. an additional quantity of a solid dark resin distils over. Preferably the coal is preheated to about 100° C. before applying the superheated steam.

Further, in the process briefly described above, part of the sulphur which mainly occurs in most Pakistan coals in organically combined form and as pyritic sulphur, is eliminated as $H_2S$, which according to known processes can be either converted into elemental sulphur or sulphuric acid. Thus, for example, starting with coal containing 3.6% of total sulphur an improved coal residue was obtained which contained only 2.5% of sulphur, and was moreover lustrous and jet black in character in contrast to the dark brown, lustreless original coal powder, the calorific value of the residue being 12,411 as against 12,168 of the original. On continued heating below the temperature range of active decomposition of the coal substance at 300° C. to 330° C., the sulphur content is progressively reduced to below 1%, the time of heating very largely depending on the intimate contact of the coal particles with superheated steam.

With the help of the present invention, therefore, not only are the resins and waxes obtained in an industrially useful form, but the coal is appreciably improved through the partial elimination of sulphur, high content of which is a great draw-back for various industrial uses of the coal. From the following comparison of the analytical data of the original and treated coal in the cited example relating to 10 hours of heating, it will be further observed that the coal is also generally improved by the process to which the present invention relates:

|  | Moisture, percent | Volatile matter, percent | Ash, percent | Fixed carbon, percent | Sulphur, percent | Calorific value, B. t. u.'s per lb. | Remarks |
|---|---|---|---|---|---|---|---|
| Original coal powder | 3.1 | 38.6 | 7.9 | 50.4 | 3.6 | 12,168 |  |
| Treated coal residue | 2.0 | 5.5 | 12.7 | 79.9 | 2.5 | 12,411 | 100 parts of coal powder yielded 82.7 parts of the coal residue, and a total of 8.2 parts of modified resin. |

Analytical data of the coal residues, relating to the superheated steam treatment of coals for periods of 10 and 20 hours and of the original coal are given in the following table and this data substantiates the points discussed above.

TABLE

| | Proximate analysis, as received basis | | | | Ultimate analysis, moisture free basis | | | | | Calorific value (net), B. t. u.'s per lb. | Remarks |
|---|---|---|---|---|---|---|---|---|---|---|---|
| | Moisture, percent | Volatile matter, percent | Fixed carbon, percent | Ash, percent | C, percent | H, percent | N, percent | S, percent | O, percent | | |
| *Makerwal (Punjab) Coal* | | | | | | | | | | | |
| 1. Original coal powder. | 5.0 | 40.8 | 44.6 | 9.6 | 69.8 | 4.9 | 1.3 | 4.2 | 11.7 | 11,896 | |
| Coal residue after 10 hours' treatment with superheated steam. | 3.3 | 8.3 | 72.9 | 15.9 | 74.5 | 2.1 | 1.2 | 3.1 | 3.1 | 12,089 | 100 parts of coal powder yielded 79.1 parts of the coal residue, and a total of 9.7 parts of modified resin and waxy products on moisture-free basis. |
| Coal residue after 20 hours' treatment. | 2.8 | 7.6 | 74.2 | 15.9 | 75.0 | 1.9 | 1.2 | 2.8 | 3.3 | 12,154 | 100 parts of coal powder yielded 78.5 parts of the coal residue and a total of 10.3 parts of modified resin and waxy products on moisture-free basis. |
| *Meting (Sind) Coal* | | | | | | | | | | | |
| 2. Original coal powder. | 20.7 | 44.5 | 20.4 | 14.6 | 57.1 | 4.72 | 1.2 | 2.48 | 19.9 | 9,686 | |
| Coal residue after 10 hours' treatment. | 3.2 | 14.5 | 58.69 | 23.73 | 63.8 | 2.43 | 1.31 | 1.67 | 7.06 | 10,771 | 100 parts of coal powder yielded a total of 76.5 parts of the coal residue and a total of 7.4 parts of modified resin and waxy products on moisture-free basis. |
| Coal residue after 20 hours' treatment. | 4.4 | 7.7 | 58.68 | 29.3 | 65.5 | 1.35 | 0.88 | 0.87 | 2.08 | 11,234 | 100 parts of coal residue yielded 71.1 parts of the coal residue and a total of 7.8 parts of modified resin and waxy products on moisture-free basis. |

The following example will serve to illustrate the invention but is not to be regarded as limiting it in any way.

Example

One kilogram of powdered Makerwal coal was indirectly preheated to about 100° C. in a retort provided with steam inlet, temperature recording arrangement, and an outlet into a fractional condensation system of three receivers, the first two fitted with a water-cooled condenser, the depth of the coal bed being of the order of 4″. Superheated steam was then led into the retort, taking the temperature to 280° C. and maintaining it at that level ±5° C. In the process of heating under these conditions copious fumes, carrying depolymerised resin and waxy material started to evolve at about 160° C. In about 4 hours the distillation of depolymerised resin was nearly complete, the dark solid fraction of it collecting in the first, the middle fraction in the second and the lighter fraction in the third receiver. The temperature of the steam was subsequently increased to 300° C.±5° C. and the steam treatment continued for 6 hours longer. In the course of this period, a further quantity of a dark solid product distilled over and the coal was progressively desulphurised with the evolution of $H_2S$. The coal residue obtained after this treatment was of a jet black lustrous character and formed 79.1% of the original coal, on a moisture-free basis. The total weight of the distilled depolymerised resin freed of moisture was 9.7% on the weight of the coal on a moisture-free basis.

What I claim is:

1. A process for the recovery of resins and waxes from coal with simultaneous desulphurisation and improvement of the coal, which consists in subjecting powdered coal to the action of superheated steam at a sub-carbonisation temperature range of the coals, and preferably at 200° C. to 330° C.

2. A process as claimed in claim 1, wherein the coal employed for the superheated steam treatment is powdered to the preferred particle size of range of 20–60 mesh B. S. S.

3. A process as claimed in claim 1 wherein the powdered coal mass is preheated to about 100° C. before being subjected to superheated steam treatment.

4. A process as claimed in claim 1 wherein the powdered coal mass is subjected to superheated steam treatment at temperatures above 280° C. but below the temperature range of active decomposition of coal mass, and is then treated with superheated steam in the temperature range of 300° C. to 330° C.

5. A process as claimed in claim 1 wherein the depolymerised resin distilling over with the superheated steam is collected by fractional condensation in semi-solid, liquid and lighter oily fractions.

References Cited in the file of this patent

UNITED STATES PATENTS 57,304    Esty    Aug. 21, 1866

FOREIGN PATENTS 325,816    Great Britain    Feb. 27, 1930